3,449,111
METHOD OF ELIMINATING WEEDS
William L. Wright, Greenfield, Ind., assignor to Eli Lilly and Company, Indianapolis, Ind., a corporation of Indiana
No Drawing. Filed Dec. 8, 1966, Ser. No. 600,053
Int. Cl. A01n 9/20
U.S. Cl. 71—100                    3 Claims

ABSTRACT OF THE DISCLOSURE

The present invention is directed to compositions, and the herbicidal use of such compositions, comprising a mixture of (1) a dinitroaniline of the formula

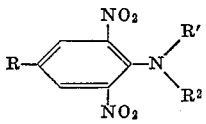

wherein R is hydrogen, $C_1$–$C_3$ alkyl, halo having an atomic weight below 85, halo-substituted $C_1$–$C_3$ alkyl wherein halo has an atomic weight below 85, $C_1$–$C_3$ alkylsulfonyl, sulfonamido, or cyano; and R' and $R^2$ are the same or different members of the group consisting of ethyl, n-butyl, and n-propyl; and (2) an alkyl N,N-di-alkylthiolcarbamate of the formula

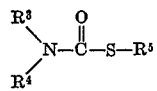

wherein $R^3$, $R^4$, and $R^5$ have the same meaning as R' and $R^2$ as defined hereinabove. In their herbicidal application, these compounds exhibit numerous advantages.

Detailed description of the invention

The process provided by this invention comprises the application to an area infested with weed seeds of from 0.25 to 1.5 pounds per acre of a dinitroaniline, represented by Formula I below, in combination with from 1 to 3 pounds per acre of an alkyl N,N-di-alkylthiolcarbamate, represented by Formula II below.

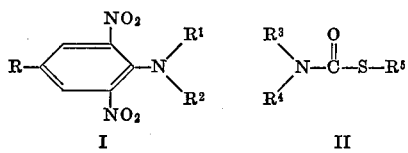

In Formulas I and II, $R^1$, $R^2$, $R^3$, $R^4$, and $R^5$ are the same or different members of the group consisting of ethyl, n-propyl, and n-butyl, and R is hydrogen, $C_1$–$C_3$ alkyl, halo having an atomic weight below 85, halo-substituted $C_1$–$C_3$ alkyl wherein halo has an atomic weight below 85, $C_1$–$C_3$ alkylsulfonyl, sulfonamido, and cyano. Illustrative groups which R can represent include, therefore, chloro, bromo, fluoro, methyl, ethyl, n-propyl, isopropyl, sulfonamido ($NH_2$–$SO_2$), trifluoromethyl, pentafluoroethyl, heptafluoro-n-propyl, methylsulfonyl, ethylsulfonyl, n-propylsulfonyl, chloromethyl, dichloromethyl, β-bromoethyl and the like groups.

Illustrative compounds coming within the scope of Formula I above include the following:

N,N-di-n-propyl-4-bromomethyl-2,6-dinitroaniline
N,N-di-ethyl-4-chloromethyl-2,6-dinitroaniline
N,N-di-n-butyl-4-chloro-2,6-dinitroaniline
N-n-butyl-N-ethyl-4-fluoro-2,6-dinitroaniline
N,N-di-n-propyl-2,6-dinitroaniline
N,N-di-n-propyl-4-bromo-2,6-dinitroaniline
N,N-di-n-propyl-4-methyl-2,6-dinitroaniline
N,N-di-ethyl-4-heptafluoro-n-propyl-2,6-dinitroaniline
N-ethyl-N-n-propyl-2,6-dinitro-4-sulfonamidoaniline
N,N-di-ethyl-2,6-dinitro-4-n-propylaniline
N-ethyl-N-n-propyl-4-trifluoromethyl-2,6-dinitroaniline
N-n-butyl-N-ethyl-4-trifluoromethyl-2,6-dinitroaniline
N,N-di-ethyl-2,6-dinitro-4-sulfonamidoaniline
N-n-propyl-N-n-butyl-4-cyano-2,6-dinitroaniline
N,N-di-n-butyl-4-methyl-2,6-dinitroaniline
N-n-propyl-N-n-butyl-4-cyano-2,6-dinitroaniline
N,N,-di-n-propyl-2,6-dinitro-4-n-propylsulfonylaniline Illustrative compounds coming within the scope of Formula II above include the following:

n-Propyl N,N-di-n-propylthiolcarbamate
Ethyl N,N-di-n-butylthiolcarbamate
Ethyl N,N-di-n-propylthiolcarbamate
n-Propyl N-ethyl-N-n-propylthiolcarbamate
n-Propyl N-n-butyl-N-ethylthiolcarbamate In accordance with the processes of my invention, one or more compounds represented by Formula I above, and one or more compounds represented by Formula II above, are formulated as emulsifiable concentrates, spreadable dusts, or wettable powders for application as weedicides to crop-growing areas. Typical formulations suitable for this weedicidal use are the following:

(1) Emulsifiable concentrate—

|  | Percent |
|---|---|
| N,N-di-n-propyl-4-trifluoromethyl-2,6 - dinitroaniline (trifluralin) | 12.6 |
| Ethyl N,N-di-n-propylthiolcarbamate (EPTC) | 36.9 |
| Emulsifiers and surfactants including non-ionics | 6.1 |
| Alkylated naphthalene | 44.4 |

(2) Wettable Powder—

|  |  |
|---|---|
| N-n-butyl-N-ethyl-4-trifluoromethyl - 2,6 - dinitroaniline (benefin) | 13.2 |
| n-Propyl - N,N - di - n - propylthiolcarbamate (vernolate) | 25.8 |
| Xylenes | 54.6 |
| Emulsifiers and surfactants | 6.2 |

Suitable emulsifiers and surfactants for use in the above formulations include non-ionics of the alkylphenol polyoxyalkylene ether type, such as a nonylphenol polyoxyethylene ether containing 13 oxyethylene residues, as well as ethoxylated polyol fatty acid esters such as a polyoxyethylene ester of stearic acid having 9 oxyethylene residues in the polyoxyethylene moiety. Suitable anionic emulsifiers include such compounds as the metal salts of alkyl-aryl sulfonates, including the magnesium, calcium, strontium, sodium, and aluminum salts; for example, calcium isobutylbenzenesulfonate, magnesium octylbenzenesulfonate, calcium myristylbenzenesulfonate, and strontium laurylbenzenesulfonate.

My novel herbicidal combinations, when formulated as either wettable powders or emulsifiable concentrates, are diluted with water and sprayed on the crop-growing area. On the other hand, if a herbicidal dust formulation is to be used, it is applied to the crop-growing area either as such or mixed with a fertilizer. The herbicidal combination, however formulated and diluted, is then applied to the crop-growing area at such a rate that from 0.25 to 1.5 pounds of a dinitroaniline represented by Formula I and from 1.0 to 3 pounds of a thiolcarbamate represented by Formula II are applied per acre.

To illustrate the effectiveness of the combinations of this invention, excellent broad-spectrum weed control is obtained with combinations of trifluralin with EPTC and of benefin with vernolate at application rates less than would be required with either herbicide alone. For example, a combination of ¼ lb./A. of trifluralin with 1 lb./A. of EPTC produced weed control equivalent to that with 2 lb./A. of EPTC alone and superior to that with ½ lb. of trifluralin alone.

In addition, combinations such as the above eliminate a far broader spectrum of weeds than either of the ingredients will eliminate by itself at the same rate of application as in the combination, although the herbicidal spectrum depends both upon the application rate and the proportion of the ingredients in the combination. The application rate depends, in turn, upon the type of soil involved, lower rates being suitable for sandy soils and higher rates for medium and heavy clay loams.

Among the weeds which can be eliminated from a crop-growing area by application thereto of the above two herbicides in combination in the amounts specified are included species of the genus Digitaria, such as crabgrass; Setaria, such as green and yellow foxtail; Sorghum, such as Johnson grass; Eleusine, such as goosegrass; Cenchrus, such as sandbur; Panicum, such as witchgrass and Texas panicum; Amaranthus, such as pigweed; Polygonum, such as smartweed; Chenopodium, such as lambsquarter; Stellaria, such as chickweed; Mollugo, such as carpetweed; Salsola, such as Russian thistle; and Cyperus, such as nutsedge; as well as species within the genera Kochia, Galinsoga, and Portulaca.

The novel combinations of this invention are particularly valuable for the control of weeds in fields for growing dry beans, snap beans, Irish potatoes, and peanuts.

The herbicidal effectiveness of the combinations of this invention is surprising. For example, an application of 0.7 pound of N-ethyl-N-n-butyl-4-trifluoromethyl-2,6-dinitroaniline (benefin) per acre and 1.5 pounds of propyl N,N-di-n-propylthiolcarbamate (vernolate) per acre gives excellent control of a number of weed species including nutsedge. Nutsedge alone is not controlled by the application of 10 pounds per acre of N-ethyl-N-n-butyl-4-trifluoromethyl-2,6-dinitroaniline while about 2.5 pounds of n-propyl N,N-di-n-propylthiolcarbamate per acre are customarily required to control this weed. Thus, there is a synergistic action between compounds represented by Formula I and those represented by Formula II above in the control of nutsedge in crop-growing areas, inasmuch as nutsedge is not controlled at all by the compounds of Formula I and the addition of relatively small amounts of such a compound greatly decreases the rate at which the thiolcarbamates of Formula II must be applied for its control. In addition, it has frequently been found that the yield of the crop from the area treated with one of my novel combinations is increased over the yield in a similar untreated area, although it is not possible to determine whether this increase in yield is due entirely to the absence of weeds in the area, and therefore to the absence of plants which are competitive with the crop plant for soil nutrients, or whether some more subtle effect is involved.

The following is an example of the use of the novel process of this invention in controlling weeds: Greenhouse flats were seeded to 4 crop plants and 8 weed species. The flats were treated with trifluralin and EPTC alone and in various combinations. Part of each flat was not treated with either herbicide and served as a control area. The amount of damage to each variety of plant was determined by observation 15 days after treatment. The table which follows gives the results of the tests. In the table, column 1 gives the rate in pounds per acre at which trifluralin was applied to the flat and column 2 the same information for EPTC. Columns 3 through 6 gives the plant injury rating on the 4 crop plants using the following scale:

0—No effect.
1—Some effect.
2—Moderate effect.
3—Severe effect.
4—Death of plant.

Columns 7 through 14 give the plant injury rating for the group of 8 weed species.

TABLE I

| Rate in lb./A for trifluralin | Rate in lb./A for EPTC | Crops | | | | Weeds | | | | | | | |
|---|---|---|---|---|---|---|---|---|---|---|---|---|---|
| | | Soybean | Cotton | Peanuts | Safflower | Crabgrass | Wild oats | Wild cane | Pigweed | Ragweed | Smartweed | Jimsonweed | Bindweed |
| .25 | 0 | 0 | 0 | 0 | 1 | 3 | 3 | 3 | 3 | 0 | 3 | 0 | 2 |
| .50 | 0 | 0 | 0 | 0 | 0 | 4 | 3 | 3 | 4 | 1 | 2 | 0 | 2 |
| 0 | 1 | 1 | 1 | 0 | 0 | 1 | 3 | 3 | 3 | 3 | 2 | 0 | 0 |
| 0 | 2 | 2 | 2 | 0 | 0 | 2 | 3 | 3 | 4 | 1 | 1 | 0 | 0 |
| .25 | 1 | 0 | 0 | 0 | 0 | 3 | 3 | 3 | 4 | 0 | 0 | 0 | 1 |
| .25 | 2 | 2 | 2 | 0 | 0 | 3 | 4 | 4 | 4 | 0 | 3 | 2 | 1 |
| .50 | 1 | 1 | 0 | 0 | 0 | 3 | 4 | 4 | 4 | 1 | 2 | 0 | 2 |
| .50 | 2 | 2 | 1 | 0 | 0 | 3 | 4 | 3 | 4 | 3 | 3 | 3 | 2 |
| 0 | 0 | 0 | 0 | 0 | 0 | 0 | 0 | 0 | 0 | 0 | 0 | 0 | 0 |

The effectiveness of combinations of trifluralin with EPTC and benefin with vernolate have also been demonstrated in field applications. Each of these combinations, as well as the component herbicides alone, was preplant soil incorporated with a power-driven rotary hoe to a depth of 2–3 inches in a clay-loam soil. Reference crops were seeded in the treated areas. The following Tables II and III show the results of these tests. In the tables, Column 1 gives the name(s) of the herbicide(s) employed; Column 2, application rates; Column 3, injury ratings for the crop plant (soybeans or peanuts); and, Columns 4–6, weed injury ratings.

TABLE II

| Herbicide(s) | Rate (lb./A) | Crop injury rating,[2] Soybean | Weed control ratings [1] | | |
|---|---|---|---|---|---|
| | | | Nut-sedge [3] | Venice mallow velvet leaf | Pigweed purslane |
| Trifluralin+EPTC | ¼+4 | 1.0 | 10.0 | 9.3 | 9.7 |
| | 2 | 0 | 9.7 | 8.7 | 9.3 |
| | 1 | 0 | 9.3 | 8.3 | 9.3 |
| | ½ | 0 | 9.0 | 6.0 | 9.0 |
| | ¼ | 2.3 | 9.0 | 5.0 | 9.0 |
| | ½+4 | 1.7 | 10.0 | 9.3 | 10.0 |
| | 2 | 0.7 | 9.7 | 7.7 | 10.0 |
| | 1 | 0.3 | 9.7 | 7.3 | 10.0 |
| | ½ | 1.0 | 9.3 | 4.7 | 10.0 |
| | ¼ | 0.3 | 7.3 | 3.7 | 10.0 |
| EPTC+Trifluralin | 2+2 | 1.0 | 10.0 | 9.7 | 10.0 |
| | 1 | 1.0 | 10.0 | 9.3 | 10.0 |
| | ½ | 0.3 | 9.3 | 9.3 | 10.0 |
| | ¼ | 0 | 10.0 | 9.0 | 10.0 |
| | ⅛ | 0 | 10.0 | 9.0 | 10.0 |
| | 4+2 | 2.0 | 10.0 | 9.7 | 10.0 |
| | 1 | 1.3 | 10.0 | 9.7 | 10.0 |
| | ½ | 0 | 10.0 | 9.7 | 10.0 |
| | ¼ | 0 | 10.0 | 9.7 | 10.0 |
| | ⅛ | 0 | 10.0 | 9.7 | 10.0 |
| Trifluralin | ¼ | 0 | 6.1 | 5.3 | 6.7 |
| | ½ | 0.3 | 1.7 | 2.0 | 10.0 |
| EPTC | 2 | 0 | 10.0 | 9.7 | 10.0 |
| | 4 | 1.0 | 10.0 | 10.0 | 10.0 |
| Control | 0 | 0 | 3.0 | 0 | 3.3 |

[1] Weed control ratings 0–10.—0=no control, 10=complete control.
[2] Crop injury ratings 0–10.—0=no injury, 10=death of plant.
[3] Replicates 1 and 2 were located in an area where the nutsedge population was very low. This fact is responsible for some of the discrepancies noted.

TABLE III

| Herbicide(s) | Rate (lb./A) | Crop injury rating,[2] Virginia peanuts | Weed control ratings [1] | | |
|---|---|---|---|---|---|
| | | | Nut-sedge | Venice mallow velvet leaf | Pigweed purslane |
| Benefin+Vernolate | ⅜+4 | 2.7 | 9.7 | 9.7 | 10.0 |
| | 2 | 2.0 | 8.7 | 8.7 | 10.0 |
| | 1 | 0 | 7.3 | 7.0 | 9.7 |
| | ½ | 0 | 4.3 | 5.3 | 9.3 |
| | ¼ | 0 | 1.3 | 2.3 | 8.3 |
| Do | ¾+4 | 1.7 | 9.7 | 9.0 | 10.0 |
| | 2 | 0.7 | 9.0 | 8.0 | 10.0 |
| | 1 | 0 | 7.7 | 5.7 | 10.0 |
| | ½ | 0 | 5.0 | 4.0 | 9.7 |
| | ¼ | 0 | 2.7 | 3.7 | 7.0 |
| Vernolate+Benefin | 2+2 | 3.0 | 9.0 | 8.7 | 10.0 |
| | 1 | 2.7 | 9.0 | 8.7 | 10.0 |
| | ½ | 2.3 | 9.0 | 8.3 | 10.0 |
| | ¼ | 2.3 | 8.7 | 8.3 | 10.0 |
| | ⅛ | 1.3 | 8.7 | 8.7 | 10.0 |
| Do | 4+2 | 3.3 | 10.0 | 9.7 | 10.0 |
| | 1 | 2.3 | 10.0 | 9.7 | 10.0 |
| | ½ | 2.0 | 10.0 | 9.7 | 10.0 |
| | ¼ | 2.3 | 10.0 | 9.7 | 10.0 |
| | ⅛ | 2.3 | 9.7 | 9.3 | 10.0 |
| Benefin | ⅜ | 0 | 2.3 | 0 | 2.7 |
| | ¾ | 0 | 0.7 | 2.3 | 5.3 |
| Vernolate | 2 | 1.0 | 8.7 | 8.3 | 9.7 |
| | 4 | 2.0 | 10.0 | 9.7 | 10.0 |
| Control | 0 | 0 | 0 | 0 | 0 |
| | 0 | 0 | 0 | 0 | 0 |

[1] Crop injury ratings 0–10.—0=no injury, 10=death of plant.
[2] Weed control rating 0–10.—0=no control, 10=complete control.

As can be seen from Tables II and III, combinations of ¼ lb./A. of trifluralin and 1 lb./A. of EPTC are as effective in controlling the weed species as either herbicide alone at twice the application rate. Likewise, specific combinations of benefin and vernolate are more effective against certain weed species at lower application rates than either herbicide alone.

I claim:
1. A method of eliminating virtually all weed species from a crop-growing area infested with weed seeds which comprises applying to said area 0.25 to 1.5 pounds per acre of a dinitroaniline of the formula:

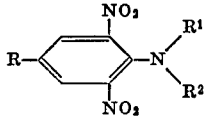

wherein $R^1$ and $R^2$ are the same or different members of the group consisting of ethyl, n-propyl, and n-butyl and R is hydrogen, $C_1$–$C_3$ alkyl, halo having an atomic weight below 85, halo-substituted $C_1$–$C_3$ alkyl wherein halo has an atomic weight below 85, $C_1$–$C_3$ alkylsulfonyl, sulfonamido, and cyano; in combination with from 1 to 3 pounds per acre of an alkyl N,N-di-alkylthiolcarbamate of the formula:

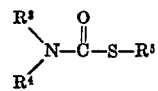

wherein $R^3$, $R^4$, and $R^5$ are the same or different members of the group consisting of ethyl, n-propyl, and n-butyl.

2. The method according to claim 1 wherein the dinitroaniline is N,N-di-n-propyl-4-trifluoromethyl-2,6-dinitroaniline and the alkyl N,N-dialkylthiolcarbamate is ethyl N,N-di-n-propylthiolcarbamate.

3. The method according to claim 1 wherein the dinitroaniline is N-n-butyl-N-ethyl-4-trifluoromethyl-2,6-dinitroaniline and the alkyl N,N-dialkylthiolcarbamate is n-propyl-N,N-di-n-propylthiolcarbamate.

References Cited

UNITED STATES PATENTS

| | | | |
|---|---|---|---|
| 3,095,299 | 6/1963 | Luckenbaugh | 71—100 |
| 3,257,190 | 6/1966 | Soper | 71—97 X |
| 3,321,292 | 5/1967 | Soloway et al. | 71—103 |

JAMES O. THOMAS, *Primary Examiner.*

U.S. Cl. X.R.

71—103, 105, 121

PO-1050
(5/69)

UNITED STATES PATENT OFFICE
CERTIFICATE OF CORRECTION

Patent No. 3,449,111  Dated  June 10, 1969

Inventor(s) William L. Wright

It is certified that error appears in the above-identified patent and that said Letters Patent are hereby corrected as shown below:

At column 2, line 28, cancel "N-n-propyl-N-n-butyl-4-cyano 2,6-dinitroaniline", and substitute therefor
--N,N-di-ethyl-4-methylsulfonyl-2,6-dinitroaniline--.

SIGNED AND
SEALED
MAY 26 1970

(SEAL)
Attest:

Edward M. Fletcher, Jr.
Attesting Officer

WILLIAM E. SCHUYLER, JR.
Commissioner of Patents